(12) United States Patent
Kim et al.

(10) Patent No.: US 8,629,968 B2
(45) Date of Patent: Jan. 14, 2014

(54) LIQUID CRYSTAL DISPLAY DEVICE

(75) Inventors: Hak Rin Kim, Daegu (KR); Yong Hun Kim, Gyeongsangbuk-do (KR)

(73) Assignee: Kyungpook National University Industry-Academic Cooperation, Daegu (KR)

( * ) Notice: Subject to any disclaimer, the term of this patent is extended or adjusted under 35 U.S.C. 154(b) by 184 days.

(21) Appl. No.: 13/348,944

(22) Filed: Jan. 12, 2012

(65) Prior Publication Data

US 2013/0016312 A1    Jan. 17, 2013

(51) Int. Cl.
    *C09K 19/02*    (2006.01)

(52) U.S. Cl.
    USPC ............... 349/168; 349/62; 349/63; 349/64

(58) Field of Classification Search
    USPC .............................................. 349/62–65, 168
    See application file for complete search history.

(56) References Cited

U.S. PATENT DOCUMENTS

2010/0315585 A1    12/2010  Chien et al.
2011/0025934 A1*   2/2011   McCarthy et al. ............. 349/20

FOREIGN PATENT DOCUMENTS

KR    1020060104994 A    10/2006
KR    1020090125326 A    12/2009

OTHER PUBLICATIONS

Kim et al., "A vertical-field-driven polymer-stabilized blue phase liquid crystal displays with prism sheet films", Jan. 13-14, 2011, The 13th Korean Liquid Crystal Conference, Yeungnam University.
Kim et al., "A vertical-field-driven polymer-stabilized blue phase liquid crystal displays", May 17-18, 2011, Society for Information Display 2011 International Symposium Digest of the Technical Papers, Sessions 3-40, vol. XL II, Book I.
Kim et al., "A vertical-field-driven Polymer-Stabilized Blue Phase Liquid Crystal Mode by using Refraction Effect of Prism Sheets", May 27, 2011, The 18th Conference on Optoelectronics and Optical Communications.

\* cited by examiner

*Primary Examiner* — Phu Vu
(74) *Attorney, Agent, or Firm* — Carter, DeLuca, Farrell & Schmidt LLP

(57) ABSTRACT

The liquid crystal display device may include a first electrode; a second electrode facing the first electrode and forming a vertical electrical field together with the first electrode; a blue phase liquid crystal layer provided between the first electrode and the second electrode; and a first prism sheet provided to face the second electrode with the first electrode between the second electrode and the first prism sheet. The first prism sheet changes a path of incident light so that the incident light from the outside obliquely enters the blue phase liquid crystal layer with respect to the vertical electrical field.

15 Claims, 14 Drawing Sheets a) The transmittance of PS-BPLC cell

LIQUID CRYSTAL DISPLAY DEVICE

CROSS-REFERENCE TO RELATED APPLICATIONS

This U.S. non-provisional patent application claims priority under 35 U.S.C. §119 of International Application No. PCT/KR2011/005156, filed on Jul. 13, 2011 and Korean Patent Application No. 10-2011-0146289, filed on Dec. 29, 2011, the entire contents of which are hereby incorporated by reference.

BACKGROUND

The present inventive concept herein relates to liquid crystal display device, and more particularly, to a liquid crystal display device using a blue phase liquid.

Polymer-stabilized blue phase liquid crystal displays (PS-BPLCD) have attracted much interest as promising next-generation liquid crystal displays due to the advantages that it can align the liquid crystal without an alignment layer and can get a driving speed 100 times higher than that of a conventional nematic liquid crystal display. However, a conventional PS-BPLCD has not been yet commercialized because of a high driving voltage and a low optical transmittance. In the conventional PS-BPLCD, a driving characteristic is obtained by an in-phase switching (IPS) method because the amount of birefringence having an optical axis in an electric filed direction increases as a voltage applied increases. When performing the IPS method, since an upper portion of patterned electrode cannot obtain a transmitted light effectively, it is forced to have a characteristic of low aperture ratio and since a strength of horizontal electric field is rapidly reduced near the top substrate in which an electrode is not formed, the amount of induced birefringence is very small. Those are root causes making the conventional PS-BPLCD have a low transmittance and a high driving voltage together with the reduction of effective electric field caused by a polymer doped to get a stabilized blue phase in a wide temperature range.

When driving the PS-BPLCD using a vertical electric field, since an optical axis is formed in parallel to a progress direction of vertically entered light, a gray-scale property according to a voltage cannot be obtained between crossed polarizers.

SUMMARY

Embodiments of the inventive concept provide a liquid crystal display device. The liquid crystal display device may include a first electrode; a second electrode facing the first electrode and forming a vertical electrical field together with the first electrode; a blue phase liquid crystal layer provided between the first electrode and the second electrode; and a first light path changing member provided to face the second electrode with the first electrode between the second electrode and the first light path changing member. The first light path changing member changes a path of incident light so that the incident light from the outside obliquely enters the blue phase liquid crystal layer with respect to the vertical electrical field.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Figure 1:
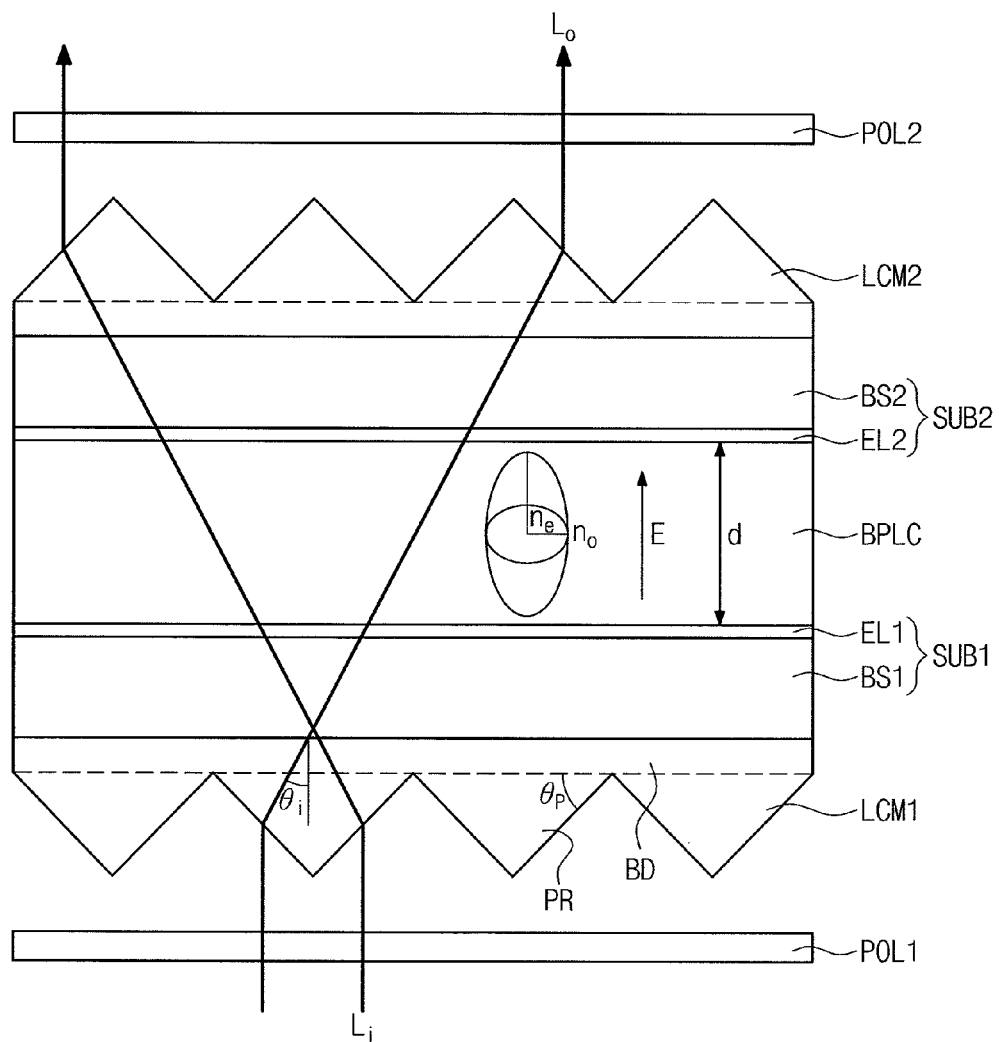
FIG. 1 is a cross sectional view of liquid crystal display device in accordance with an embodiment of the inventive concept.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element such as a layer, region or substrate is referred to as being "on" or "onto" another element, it may lie directly on the other element or intervening elements or layers may also be present. It will also be understood that when an element such as a layer, region or substrate is referred to as being "under" another element, it may lie directly under the other element or intervening elements or layers may also be present.

FIG. 1 is a cross sectional view of liquid crystal display device in accordance with an embodiment of the inventive concept.

Referring to FIG. 1, the liquid crystal display device includes a first substrate SUB1, a second substrate SUB2, a blue phase liquid crystal layer BPLC, a first light path changing member LCM1, a second light path changing member LCM2, a first polarizer POL1, and a second polarizer POL2.

The first substrate SUB1 includes a first base substrate BS1 and a first electrode EL1 provided on the first base substrate BS1. According to an embodiment of the inventive concept, the first substrate SUB1 may further include a thin film transistor (not illustrated) electrically connected to the first electrode EL1. In the case that the first electrode EL1 is provided in plural number, the thin film transistor corresponding to the first electrode EL1 may also be provided in the plural number. The thin film transistor switches a driving signal provided to the first electrode EL1.

The second substrate SUB2 is disposed to face the first substrate SUB1 and includes a second base substrate BS2 and a second electrode EL2 provided on the second base substrate BS2. The first and second electrodes EL1 and EL2 are disposed to face each other. If voltages having different levels are applied to the first and second electrodes EL1 and EL2, a vertical electric filed is formed between the first and second electrodes EL1 and EL2.

The first base substrate BS1 and the second base substrate BS2 may be transparent insulating substrates and may be formed from material such as glass, plastic, crystal, etc. The first electrode EL1 and the second electrode EL2 may include a transparent conductive material, for example, a material such as an indium tin oxide (ITO) or an indium zinc oxide (IZO).

The blue phase liquid crystal layer BPLC is provided between the first substrate SUB1 and the second substrate SUB2, that is, between the first electrode EL1 and the second electrode EL2.

The blue phase liquid crystal layer BPLC in accordance with an embodiment of the inventive concept is an intermediate phase that appears in chiral liquid crystal appearing within the temperature range between a chiral nematic or cholesteric phase and an isotropic liquid crystal phase. The blue phase liquid crystal layer BPLC may be made by mixing nematic liquid crystal with chiral dopant of about 10%.

The blue phase liquid crystal layer BPLC shows a selective reflection of circularly polarized light, similar to the cholesteric phase. The blue phase liquid crystal layer BPLC has a double-twist cylindrical (DTC) structure. The double-twist cylindrical (DTC) structure is a shape such that in the center, a liquid director parallel to an axis spatially rotates with respect to a radius. The blue phase liquid crystal layer BPLC has a fluid lattice of which structure is stabilized by lattice defects. In the blue phase liquid crystal layer BPLC Bragg diffraction of visible light and a photonic band can be electrically controlled due to the characteristic described above.

In an embodiment of the inventive concept, the blue phase liquid crystal layer BPLC may be a polymer-stabilized blue phase liquid crystal PS-BPLC. The blue phase liquid crystal layer BPLC exists within a temperature range between the isotropic phase and the cholesteric phase. To expand the temperature range, a polymer may be selectively dispersed into the blue phase liquid crystal layer BPLC. If a polymer is dispersed into the blue phase liquid crystal layer BPLC to form a cross linked network, an arrangement of the blue phase liquid crystal molecules is stabilized. The polymer can make an arrangement of blue phase liquid crystal director to stabilize it or can control fixing an arrangement structure of the blue phase liquid crystal layer BPLC. Thus, the polymer-stabilized blue phase liquid crystal PS-BPLC is thermally stabilized and may exist as a blue phase in a wider temperature range than that of a polymer blue phase liquid crystal that is not stabilized.

The blue phase liquid crystal layer BPLC represents an isotropic state at the beginning. If a voltage is applied to the blue phase liquid crystal layer BPLC, it switches from an isotropic state to an anisotropic state by Kerr effect that a reflective index is changed depending on an electric field.

The first light path changing member LCM1 faces the blue phase liquid crystal layer BPLC with the first substrate SUB1 between the first light path changing member LCM1 and the blue phase liquid crystal layer BPLC. That is, the first light path changing member LCM1 is provided on the outside of the first substrate SUB1. When an incident light $L_i$ from the outside enters the blue phase liquid crystal layer BPLC, the first light path changing member LCM1 changes a path of the incident light $L_i$ so that the incident light $L_i$ obliquely enters with respect to a vertical field E formed by the first electrode EL1 and the second electrode EL2.

The first light path changing member LCM1 may be an optical sheet and the first light path changing member LCM1 may include a body BD and a plurality of protrusions PR disposed on the body BD. The protrusions PR may have a cross section of polygonal shape, e.g., triangle when cutting the protrusions along a direction perpendicular to one side of the body BD. Herein, each of the protrusions PR may have a quadrangular pyramid shape or a triangular pyramid shape. Also, each of the protrusions PR may be formed to extend in a first direction. The first light path changing member LCM1 may be a prism sheet.

The second light path changing member LCM2 faces the blue phase liquid crystal layer BPLC with the second substrate SUB2 between the second light path changing member LCM2 and the blue phase liquid crystal layer BPLC. That is, the second light path changing member LCM2 is provided on the outside of the second substrate SUB2. The second light path changing member LCM2 changes a path of a light $L_o$ being output from the blue phase liquid crystal layer BPLC so that the light $L_o$ being output from the blue phase liquid crystal layer BPLC travels in a direction perpendicular to a surface of the second substrate SUB2. The second light path changing member LCM2 may also be an optical sheet and the second light path changing member LCM2 may include a body BD and a plurality of protrusions PR disposed on the body BD. The protrusions PR may have a cross section of polygon, e.g., triangle when cutting the protrusions along a direction perpendicular to one side of the body BD. Herein, each of the protrusions PR may have a quadrangular pyramid shape or a triangular pyramid shape. Also, each of the protrusions PR may be formed to extend in a second direction and the second light path changing member LCM1 may be a prism sheet. The first light path changing member LCM1 and the second light path changing member LCM2 may have a same shape or a different shape.

The first polarizer POL1 polarizes the incident light $L_i$ in a third direction. The first polarizer POL1 may be provided between the first substrate SUB1 and the first light path changing member LCM1 or may be provided to face the first substrate SUB1 with the first light path changing member LCM1 between the first substrate SUB1 and the first polarizer POL1.

The second polarizer POL2 polarizes the emitting light $L_o$ in a fourth direction. The second polarizer POL2 may be provided between the second substrate SUB2 and the second light path changing member LCM2 or may be provided to face the second substrate SUB2 with the second light path changing member LCM2 between the second substrate SUB2 and the second polarizer POL2. The first and second directions may be a same direction or may be a different direction from the third and fourth directions. For example, the first and second directions may be provided in a same direction that is inclined at 45° with respect to the third direction.

In an embodiment of the inventive concept, the first polarizer POL1 is disposed to face the first substrate SUB1 with the first light path changing member LCM1 between the first substrate SUB1 and the first polarizer POL1 and the second polarizer POL2 is disposed to face the second substrate SUB2 with the second light path changing member LCM2 between the second substrate SUB2 and the second polarizer POL2.

The first polarizer POL1 and the second polarizer POL2 may be provided to be parallel to each other or to be perpendicular to each other. That is, the third direction may be perpendicular to the fourth direction. In an embodiment of the inventive concept, the first polarizer POL1 has a polarizing axis perpendicular to that of the second polarizer POL2.

In an embodiment of the inventive concept, although the liquid crystal display is shown just including the first light path changing member LCM1 and the second light path changing member LCM2, the liquid crystal display device may include further optical sheets. For example, the liquid crystal display device may further include an optical sheet such as a diffusion sheet to reduce a diffraction phenomenon or moire that may be generated by the first light path changing member LCM1.

Although not illustrated in the drawing, a backlight unit for providing a light from the outside may be provided to the liquid crystal display device.

The liquid crystal display device in accordance with an embodiment of the inventive concept is driven in a Vertical Alignment mode.

In the liquid crystal display device, if an electric field is not applied to the blue phase liquid crystal, the blue phase liquid crystal does not have a refractive index anisotropy and a light penetrating the blue phase liquid crystal is blocked out by the cross polarizers, so a black state is obtained. If an electric field is applied to the blue phase liquid crystal, a phase retardation axis is generated along a direction of the electric field. The blue phase liquid crystal is changed to a refractive index anisotropic state by the electric field. A field-induced birefringence is induced along the electric field direction by a formula below.

$$\Delta n(E) = \lambda K E^2, \quad \text{[formula 1]}$$

wherein $\Delta n$ is a field-induced birefringence, $\lambda$ is a wavelength of incident light, K is Kerr constant of the blue phase liquid crystal, and E is an electric field in the blue phase liquid crystal. Although the blue phase liquid crystal itself is changed from an isotropic state to an anisotropic state due to the electric field, a polarization state of the incident light is not changed when the incident light passes by the blue phase liquid crystal layer vertically. Thus, the blue phase liquid state becomes a c-plate state. A light passing by the blue phase liquid crystal is blocked out by the cross polarizers, so a black state is obtained.

According to an embodiment of the inventive concept, the first light path changing member is disposed on the outside of the first base substrate so that an external light obliquely enters into the blue phase liquid crystal layer. In the present embodiment, the first light path changing member is a prism sheet. The external light is refracted by the first light path changing member, following Snell's law to enter the blue phase liquid crystal layer with an incident angle of $\theta_i$ ($0° < \theta_i < 90°$).

When an electric field is applied to the liquid crystal display device, transmittance of the oblique incident light with a field-induced effective refraction and the incident angle are represented by formulae 2 and 3 below.

$$\Delta n_{eff}(E) = n_o(E) \left[ \sqrt{1 - \frac{\sin^2 \theta_i}{n_e^2(E)}} - \sqrt{1 - \frac{\sin^2 \theta_i}{n_o^2(E)}} \right] \quad \text{[formula 2]}$$

$$T \propto \sin^2 \left( \frac{\pi \Delta n_{eff}(\theta_i, E) d(\theta_i)}{\lambda} \right), \quad \text{[formula 3]}$$

wherein $\Delta n_{eff}(\theta_i, E)$ is a field-induced effective refraction of the oblique incident light, $d(\theta_i)$ is an effective cell gap which is a substantial distance between the first electrode and the second electrode considering the light path. The incident angle and the field-induced effective phase retardation may be determined by an angle $\theta_p$ of the prism mount in the first light path changing member.

The second light path changing member disposed on the outside of the second base substrate concentrates a light so that the light obliquely traveling toward a surface of the second base substrate travels in a direction perpendicular to a surface of the second base substrate. Accordingly, quantity of light increases in a direction perpendicular to a surface of the second base substrate, that is, a direction in which a user sees the image and thereby brightness increases and contrast ratio also increases when considering the transmission changes of the polarizer with respect to the incident angle.

In a liquid crystal display device having the structure described above, serious problems like a high hysteresis, a low optical efficiency, and a high driving voltage appeared in a conventional IPS polymer-stabilized blue phase liquid crystal mode may be improved. Also, using the two light path changing member attached to the first and second substrates, not only optically efficient field-induced effective phase retardation is obtained but also high brightness is obtained. Consequently, a high optical efficiency, a low driving voltage, and a high response speed are obtained together.

Embodiment 1

A Polymer-Stabilized Blue Phase Liquid Crystal

According to an embodiment of the inventive concept, a liquid crystal including a mixture of a precursor of 65 wt % host nematic LC, a 25 wt % chiral dopant (S811, Merck), and 10 wt % prepolymers (trimehylopropane triacrylate (TMPTA, Tokyo Kasei Kogyo) and RM257 (Merck), and a small amount of photoinitiator was used. The photoinitiator was used so that photopolymerization reaction easily occurs to concentrate density of polymer on a disclination line. The photoinitiator was mixed by a photo-induced phase separation method. The Host NLC (BYLC53XX, BaYi Space Co.) is an eutectic mixture with birefringence of 0.119 including a lot of mesogen units. The phase-separation order of mixed precursor is an isotropic phase (48° C.)-a blue phase (47° C.)-cholesteric phase.

Figure 2:
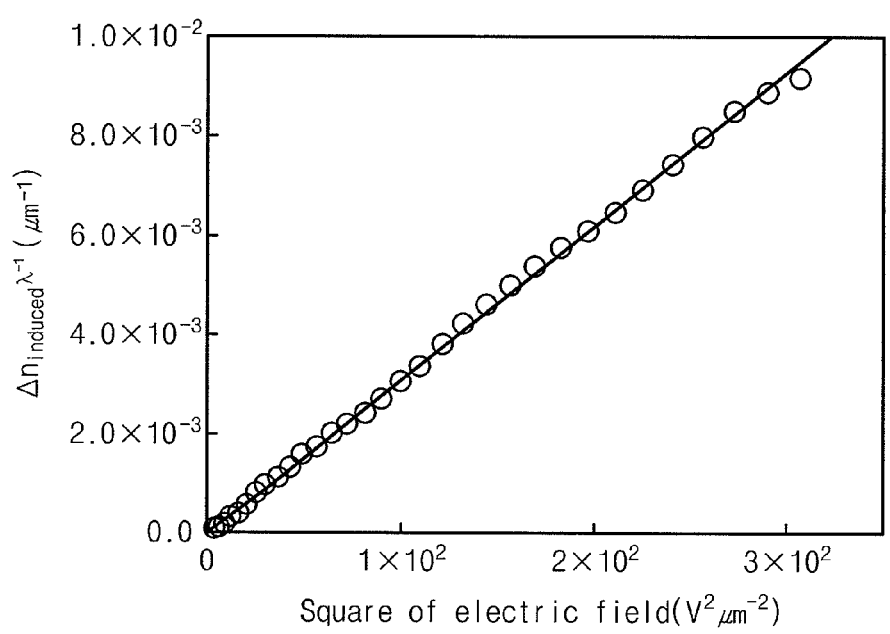
FIG. 2 is a graph showing $\Delta n_{induced}/\lambda$ as a function of the square of electric field measured at room temperature.

A cell into which the mixed precursor was injected was provided, and then UV light with a metal halide lamp of 10 mW/cm$^2$ (365 nm) was irradiated into the blue phase liquid crystal for 3 minutes to form a polymer-stabilized blue phase liquid crystal (PS-BPLC) cell. The PS-BPLC was thermally stabilized in a range of 45° C.~0° C. FIG. 2 is a graph showing $\Delta n_{induced}/\lambda$ as a function of the square of electric field measured at room temperature. In FIG. 2, a slope represents Kerr constant. According to FIG. 2, the measured Kerr constant was about 0.09 nm/V$^2$.

Embodiment 2

An Electro-Optic Effect According to an Oblique Incidence

Figure 3A:
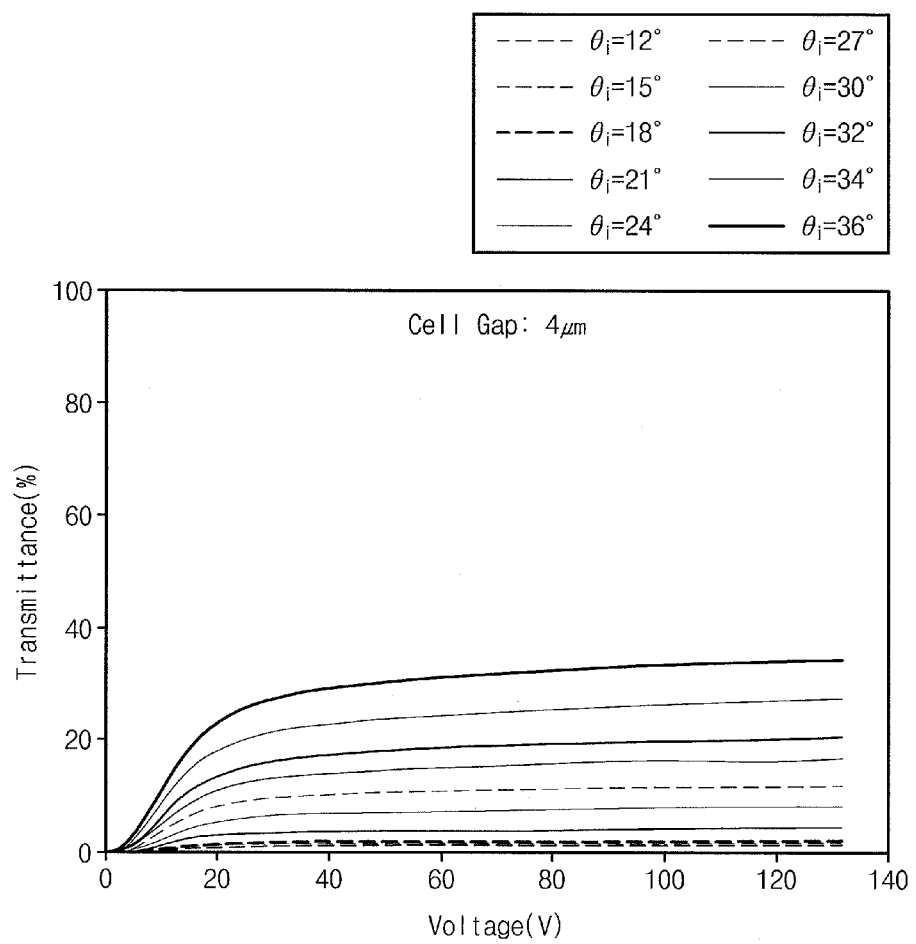
FIGS. 3A, 3B and 3C are graphs showing voltage-transmittance (V-T) curves of the PS-BPLC cells having different cell gaps according to various incident angles.
Figure 3B:
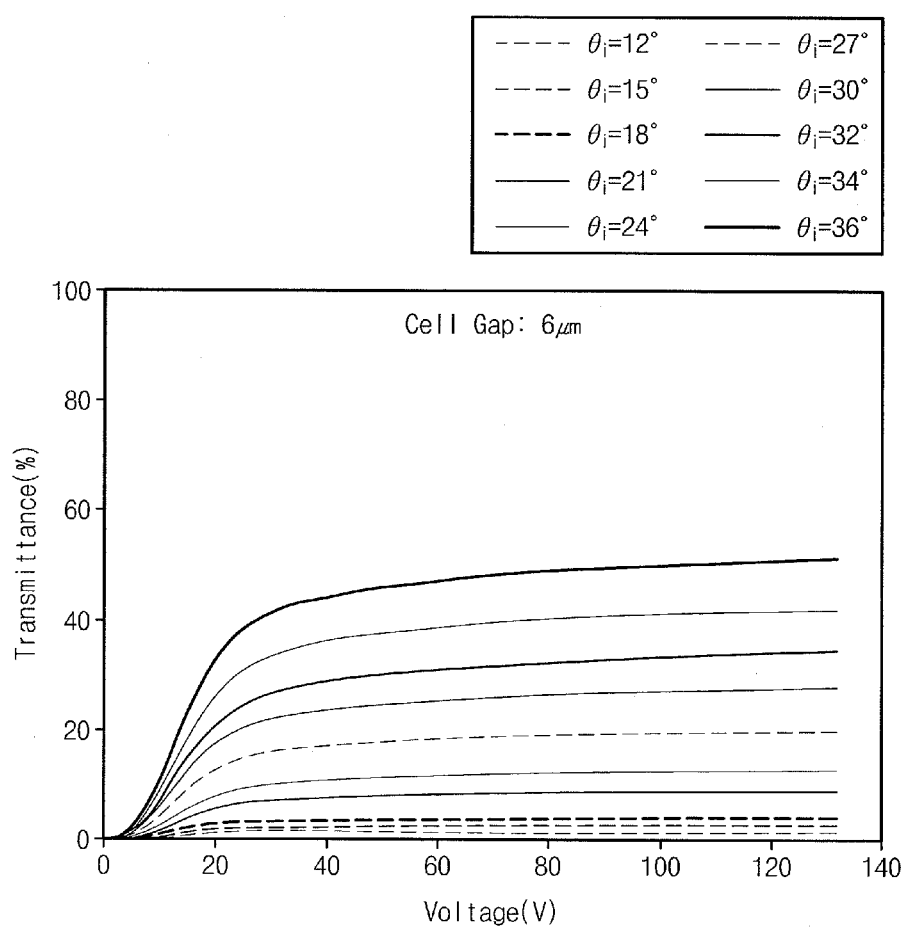
Figure 3C:
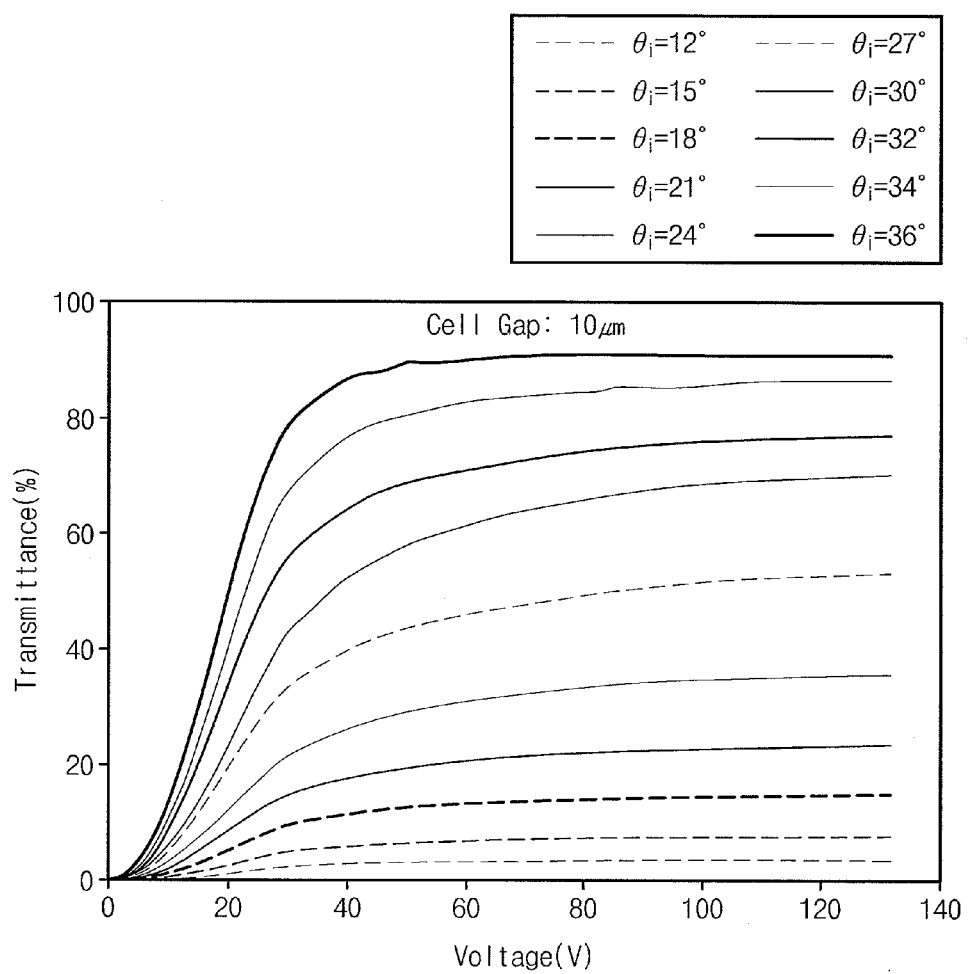

FIGS. 3A, 3B and 3C are graphs showing voltage-transmittance (V-T) curves of the PS-BPLC cells having different cell gaps according to various incident angles $\theta_i$.

In FIGS. 3A, 3B and 3C, the voltage-transmittance (V-T) curves were measured under the same condition except a cell gap. The cell gap conditions in the samples were d=4 µm in FIG. 3A, d=6 µm in FIG. 3B and d=10 µm in FIG. 3C. To determine the field-induced effective retardation in the cells, the amount of reflective optical losses at the base substrate/air surface was measured. First, without an applied voltage, a transmittance of the cells was measured in a state that the upper polarizer and the lower polarizers had the transmission axes in the same direction transmission axis. Then the upper polarizer was rotated so that the transmission axes of the lower polarizer and the upper polarizer were perpendicular to each other and a voltage was applied, followed by the optical loss was measured at the pair of polarizers and cells. The two measured transmittances were quantized by scaling the optical loss down.

The voltage-transmittance curves of FIGS. 3A, 3B and 3C were measured by applying a voltage to PB-BPLC cell and increasing the applied voltage. Hereinafter, a voltage switching condition is always set to have the same voltage condition except in the hysteresis experiment.

Referring to FIGS. 3A, 3B, and 3C, the transmittance in all the samples increased with increasing an incident angle of $\theta_i$. This is because the effective phase retardation increases under the same applied voltage condition. However, the transmittances of the samples with cell gaps of d=4 µm and 6 µm were still low under 50% transmittance at $\theta_i$ to 38°, which was in saturated state. This is because the maximum field-induced effective phase retardation is small due to low Kerr constant of the PS-BPLC material used in the experiment. However, by increasing the cell gap to 10 µm, a transmittance that exceeded 90% was obtained. In the conventional IPS PS-BPLC mode, the transmittance cannot be effectively increased though increasing the cell gap, because the transversal electric field decreases steeply as it recedes from the lower substrate. The field-induced phase retardation in IPS mode is controlled by only Kerr constant of itself, which makes it difficult to increase the transmission in IPS mode. However, in the suggested structure, the field-induced effective phase retardation is effectively improved due to flexibility of cell gap. This is because of the uniform field distribution in the entire volume area of the PS-BPLC. The voltage required for saturated transmittance linearly increases as the cell gap increases.

Embodiment 3

Fabrication of Prism Sheet

In an embodiment of the inventive concept, a prism sheet was used as the light path changing member. The prism sheet was fabricated by an imprinting process using an anisotropic wet-etched silicon wafer.

To fabricate the prism sheet, before an etching process, the silicon wafer surface was modified to become a SiO$_2$ surface (with oxidation depth of 1 µm) by means of thermal oxidation. A periodic SiO$_2$ line pattern (line width=20 µm, a space between lines=100 µm, line length=2 cm) was formed using a photolithography process and a buffer oxidation etching (BOE) solution. After that, an anisotropic wet etching was performed using a tetramethyl ammonium hydroxide (TMAH) solution diluted by 5%. As a result, a prism mount periodic pattern (periodicity=120 µm) having an etching angle of 54.7° was formed on a surface of the wafer. To obtain an ideal prism structure, the etching rate (0.8 µm/min) and the etching depth was carefully controlled.

The etched silicon wafer surface was modified to have a hydrophobic property by spin-coating Teflon, and then the silicon surface structure was replicated by the polymerized polydimethlysiloxane (PDMS) film. The replicated PDMS mold was easily detached without any defects because a hydrophobic process was performed on the silicon wafer surface. Finally, the transparent prism sheet was formed on a surface of the base substrate by an imprinting process using a PDMS mold and a UV hardened polymer (NOA89, Noriand). The prism angle $\theta_p$ of the final prism structure obtained by the NOA89 was identical to the etching angle of the anisotropic wet-etched silicon wafer surface. The refractive index of the NOA89 is about 1.45 at the wavelength (488 nm) of light source used in the experiment. When considering the refraction of vertical incident light at the prism surface, the incident angle $\theta_i$ to the blue phase liquid crystal layer BPLC was about 24° by the Snell's law. An additional refraction effects between the prism/base substrate interfaces may be negligible because the refractive index $n_{prism}$ of the prism sheet is similar to the refractive index ($n_{glass}$~1.5) of glass substrate used as the base substrate. As shown in the V-T curves, an incident angle of 24° was not sufficient to enhance the optical efficiency and the transmittance still remained below 40%. Even the cell with a cell gap of 10 µm had a low transmittance.

When increasing a prism angle of the prism sheet from $\theta_p$=54.7° to $\theta_p$=64, an incident was increased from $\theta_i$=24° to $\theta_i$=28°. In this case, a transmittance that exceeds 60% was achieved for the vertical-field-driven PS-BPLC cell (d=10 µm). Referring back to FIGS. 3A, 3B and 3C, when $\theta_i$ was over 38°, a high transmittance was achieved. To have $\theta_i$ of 38°, $\theta_p$ of 78.5° was required. However, the reflection loss at the air/prism interface of the prism sheet increases as $\theta_p$ increases.

Embodiment 4

Gray Scale Property

Figure 4:
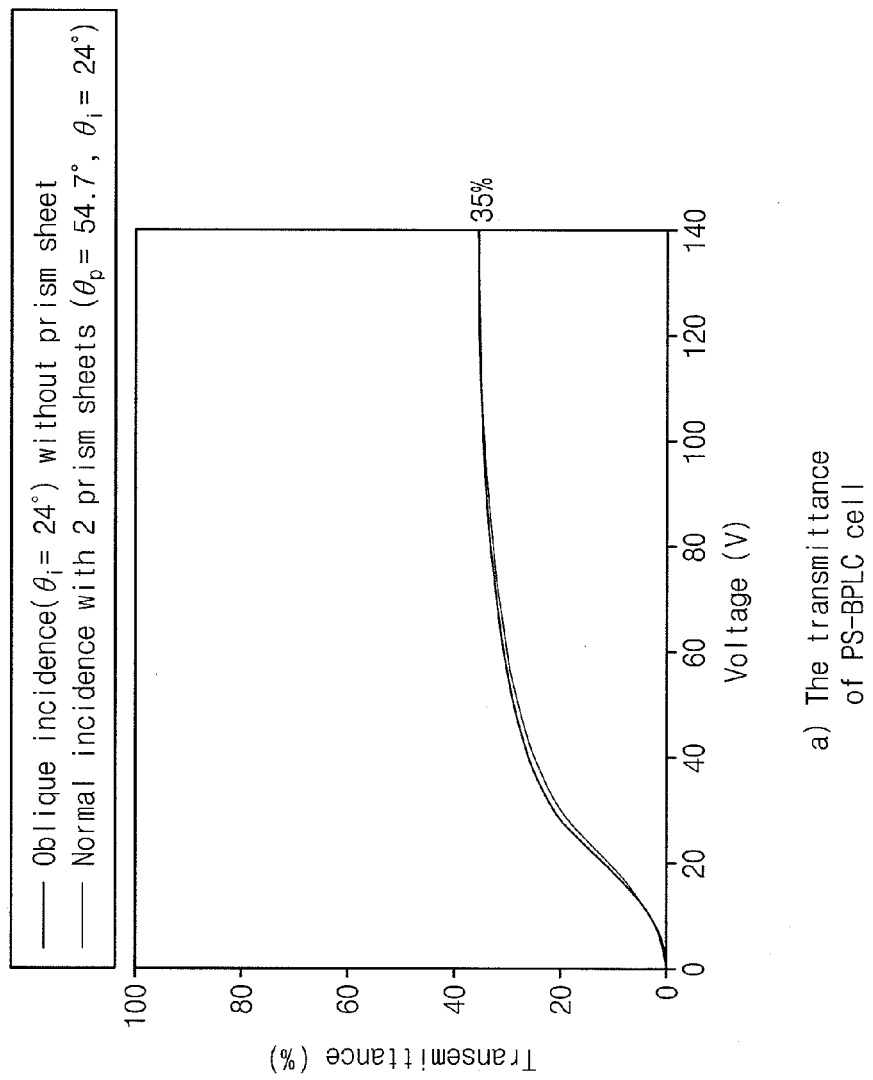
FIG. 4 is a graph showing transmittances of vertical-field driven PS-BPLC cell with/without prism sheets, measured with increasing applied voltage.

FIG. 4 is a graph showing transmittances of vertical-field driven PS-BPLC cell (d=10 µm in both cells) with/without prism sheets, measured with increasing applied voltage, which was to measure a transmittance of the PS-BPLC cell with an applied voltage when vertically irradiating an Argon laser (488 nm). The prism sheets ($\theta_p$=54.7°) were attached to both outsides of PS-BPLC cell. Align markers were patterned at the edge of the prism sheets by the photolithography process and the imprinting process. Using the align marker, the prism sheets were attached to the upper and lower substrates through an optical microscope. To obtain the transmittance, a light intensity transmitted in parallel to the lower polarizer was measured without an applied voltage. And then, a transmittance was measured on the cross polarizer by increasing an applied voltage.

Also, a transmittance of the cell (d=10 µm, $\theta_i$=24°) was measured while rotating and tilting it.

Referring to FIG. 4, an angle of light entering the blue phase liquid layer was low due to a low angle of the prism sheet and the saturated transmittance was about 35%, where the optical efficiency enhancement was not good. However, the two V-T curves agreed well with each other, which means that additional refraction effects except the refraction at the air/prism sheet interface can be negligible.

Embodiment 5

Prism Sheet and Viewing Angle

Figure 5:
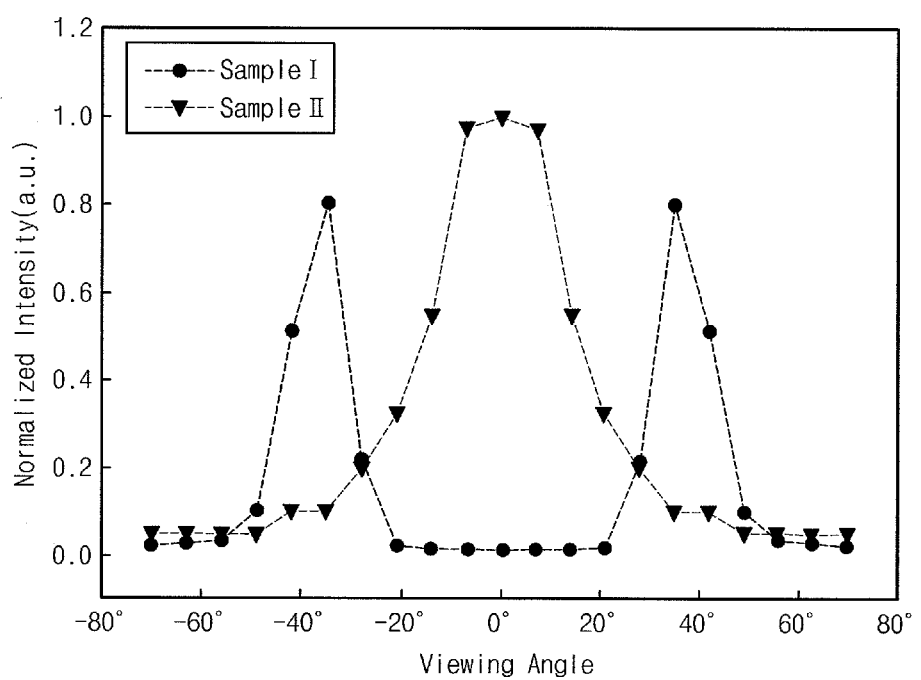
FIG. 5 is a graph showing brightness of sample I and sample II according to a viewing angle, where the sample I is a case that a prism sheet is attached to the outside of first substrate and sample II is a case that a prism sheet is attached to the outsides of the first and second substrates.

FIG. 5 is a graph showing brightness of sample I and sample II according to a viewing angle, where the sample I is a case that a prism sheet is attached to the outside of first substrate and sample II is a case that a prism sheet is attached to the outsides of the first and second substrates. The other cell conditions (d=10 µm, $\theta_i$=24°) including the blue phase liquid crystal layer were identical for the two samples.

Referring to FIG. 5, in the sample I, the degree of brightness at an oblique viewing angle was much higher than that at front viewing angle. In the sample I, the viewing angle showing the maximum brightness was theoretically about 37.5° considering $\theta_i$=24°, which agreed with the experimental result. In the sample II, the degree of the brightness decreased monotonically from the maximum brightness as the viewing angle was increased and is maximized at front viewing angle. This means that the prism sheet attached to the outside of the second substrate refracts a light again and thereby the brightness at front view angle is increased.

Embodiment 6

Optical Efficiency and Driving Voltage

Figure 6:
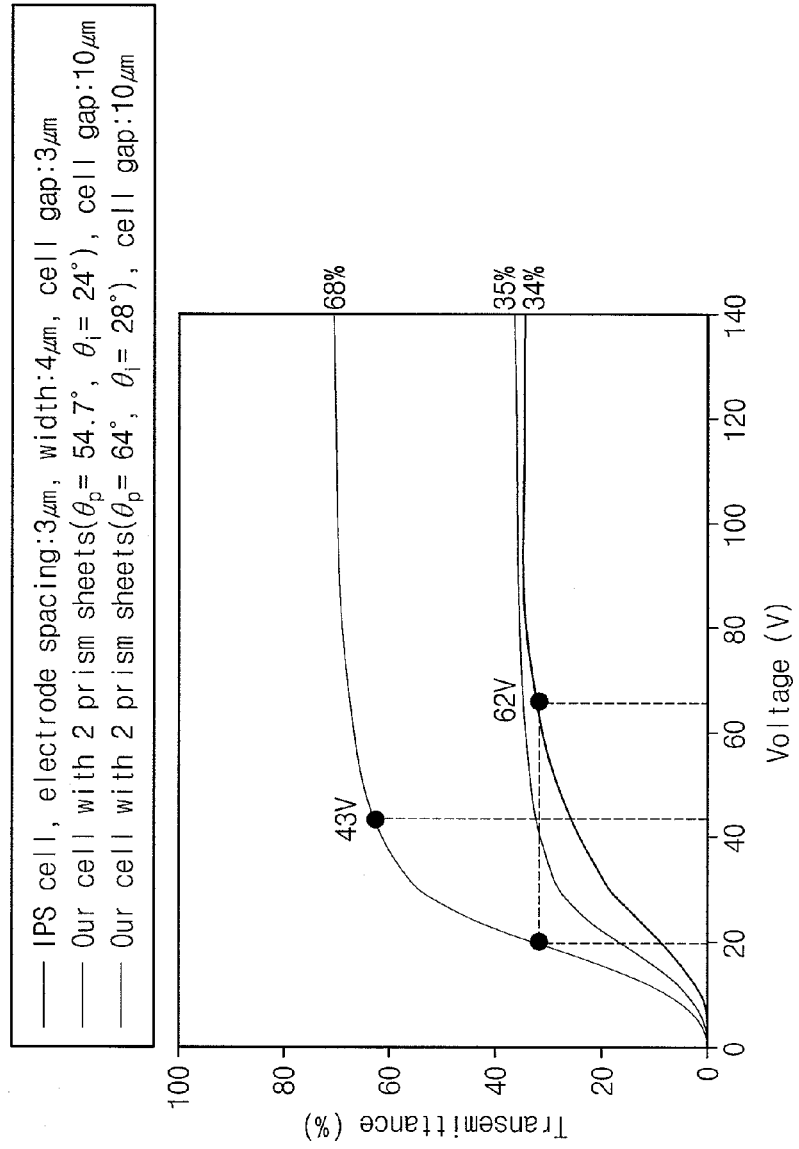
FIG. 6 is a graph showing voltage-transmittance curves of conventional IPS cell and vertical-field-driven PS-BPLC cells according to a prism angle.

FIG. 6 is a graph showing voltage-transmittance curves of conventional IPS cell and vertical-field-driven PS-BPLC cells according to a prism angle. The IPS cell was a general type IPS-BPLC without prism sheets and the vertical-field-driven PS-BPLC cell in accordance with an embodiment of the inventive concept had prism sheets of different prism angles.

To enhance the optical efficiency of the vertical-field-driven PS-BPLC cell, two prism sheets with a higher prism angle ($\theta_p$=64°) were attached to the cell (d=10 µm). In this case, an incident angle of light entering the PS-BPLC layer became 28° due to the high prism angle.

For comparison, the V-T curve of a vertical-field-driven PS-BPLC cell (d=10 µm, $\theta_p$=54.7) with two prism sheets having a lower prism angle and the V-T curve of a PS-BPLC cell (d=3 µm) driven by conventional IPS electrode structure were co-plotted together. In the IPS PS-BPLC cell, the space and the line width of the in-plane-patterned ITO electrodes were 3 µm and 4 µm respectively.

When comparing two V-T curves of the vertical-field-driven PS-BPLC cells with two prism sheets, the saturated transmittance of the cell with two prism sheets with a higher prism angle was twice higher than that of the cell with two prism sheets with a lower prism angle as shown in FIG. 6. Considering that the incident angle was increased from 24° to 28° due to the increased $\theta_p$, d ($\theta_i$) was increased by about 3% from d ($\theta_i$=24°)=10.95 µm to d ($\theta_i$=28°)=11.27 µm.

Figure 7:
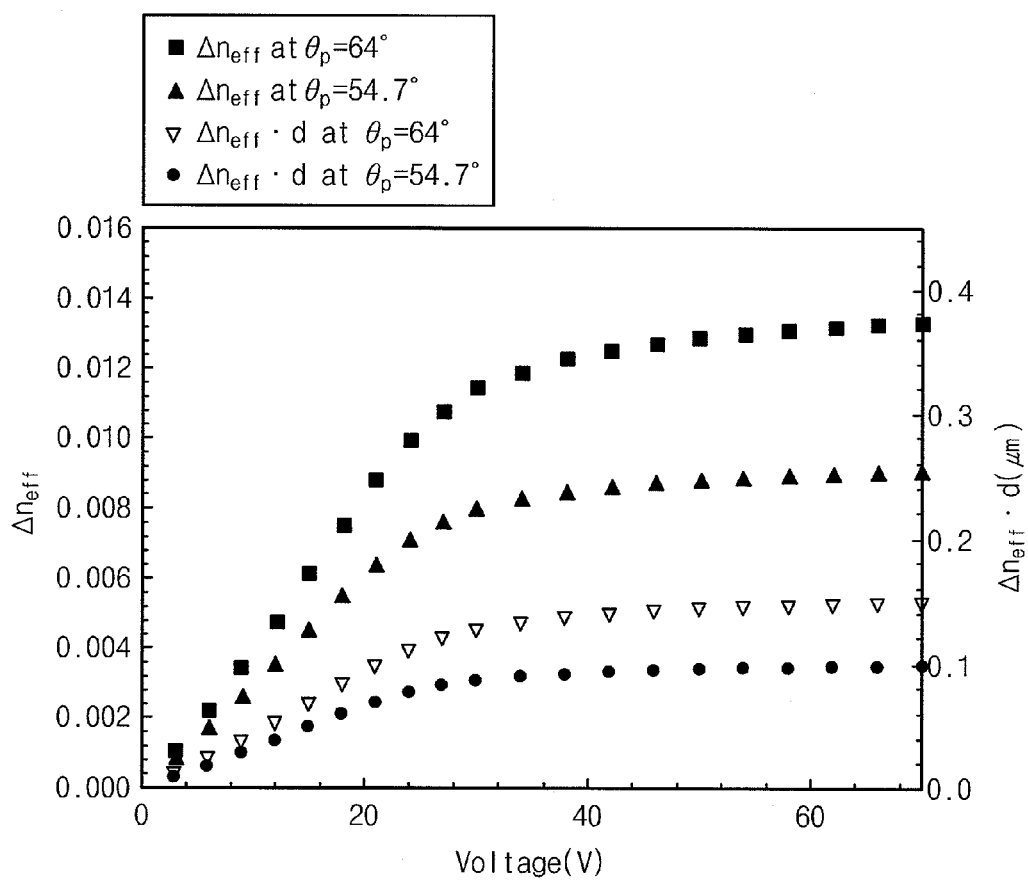
FIG. 7 is a graph showing the field-induced $\Delta n_{eff}$ and $\Delta n_{eff} \cdot d$ of vertical-field-driven PS-BPLC cells with the prism sheets having a higher prism angle and a lower prism angle according to an applied voltage.

FIG. 7 is a graph showing the field-induced $\Delta n_{\mathit{eff}}$ and $\Delta n_{\mathit{eff}}$·d of vertical-field-driven PS-BPLC cells with the prism sheets having a higher prism angle and a lower prism angle according to an applied voltage.

Referring to FIG. 7, the field-induced $\Delta n_{\mathit{eff}}$ ($\theta_i$) was increased by about 48% from 0.0089 to 0.0133. This means that the optical efficiency originated from the increased $\Delta n_{\mathit{eff}}$ ($\theta_i$) is improved by using the increased $\theta_i$.

Referring back to FIGS. 6 and 7, when comparing the V-T curves of the IPS PS-BPLC cell and the vertical-field-driven PS-BPLC with a lower prism angle, the saturated transmittances of the two cells were similar to each other. However, in the low driving voltage ranges, the transmittance of the vertical-field-driven PS-BPLC cell increased faster than that of the IPS PS-BPLC cell. This is because the field-induced birefringence is uniformly induced in the entire volume area of the vertical-field-driven PS-BPLC cell at comparably low driving voltage. The total phase retardation is accumulated as the oblique incident light travels through the cell. In the IPS PS-BPLC cell, the Kerr effect near the second substrate is insignificant at low driving voltages.

In the vertical-field-driven PS-BPLC with the prism sheet of higher prism angle, the saturated transmittance was enhanced to become almost 68%, which was twice the transmittance of the IPS PS-BPLC cell. The maximum available transmittance of the IPS PS-BPLC cell is limited to be below 43% due to the low aperture ratio caused by the IPS electrode structure. This is also because regardless of the PS-BPLC material, an electric field on the IPS electrode is weak and thereby a liquid crystal is not rotated and the negligible field-induced effective phase retardation is generated on the IPS electrode. In conventional IPS PS-BPLC mode, the relation between the IPS electrode space and the driving voltage inevitably involves a trade-off. In order to increase the aperture ratio under the same electrode space condition, the width of the electrode should be narrow, which is a factor strongly related to the production yield.

In the saturated transmittance area, an applied voltage required for 90% of the saturated transmittance was about 43V in the vertical-field-driven PS-BPLC cell with two prism sheets ($\theta_p$=64°) and was about 62V in the IPS PS-BPLC cell, which shows that the vertical-field-driven PS-BPLC cell with two prism sheets ($\theta_p$=64°) can be driven by 20V lower voltage as compared with the IPS PS-BPLC cell. If using material having a Kerr constant higher than the blue phase liquid crystal used in the present inventive concept, the driving voltage can be lowered closed to 10V (a quarter of the driving voltage presented here).

To obtain the same value as the maximum transmittance of the IPS PS-BPLC cell, the driving voltage required for the vertical-field-driven PS-BPLC cell is just 20V, which is over 40V lower than that of the IPS PS-BPLC cell. The response times when applying/not applying an electric field of the vertical-field-driven PS-BPLC cell were about 0.2 ms and about 0.6 ms, respectively, at a driving voltage of 70V.

Embodiment 7

Hysteresis

Figure 8:
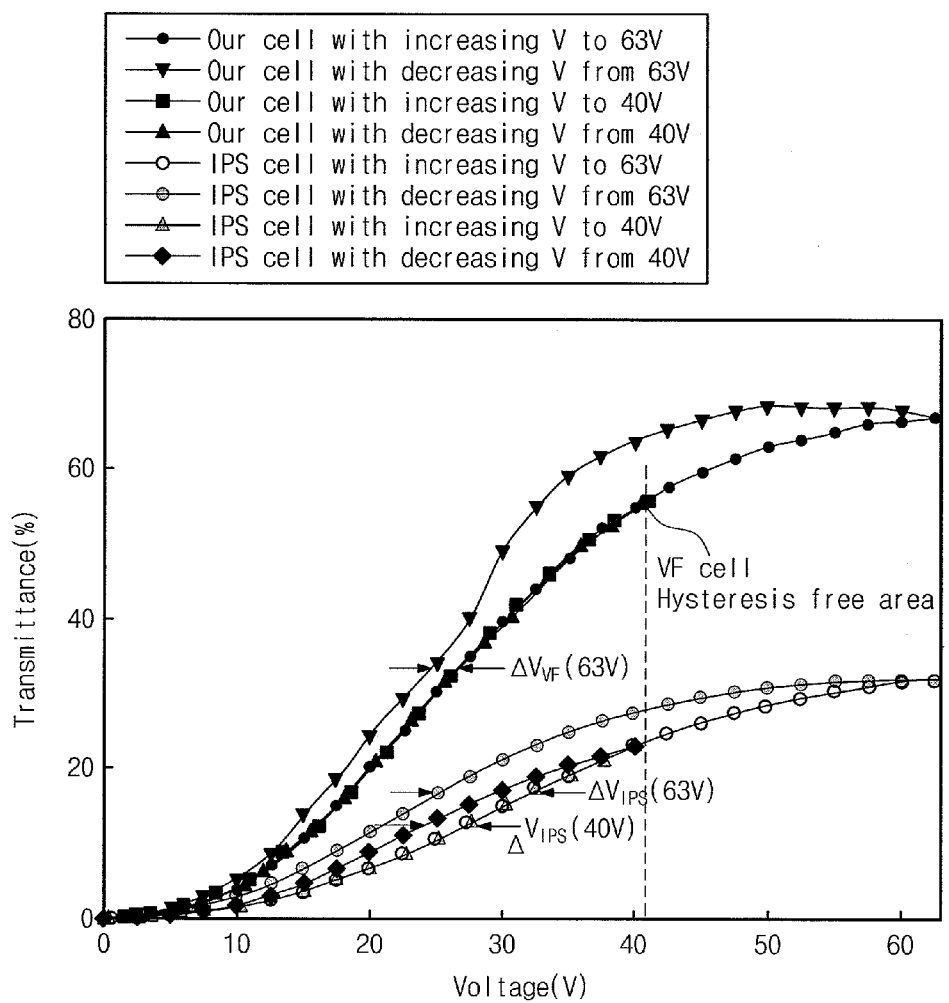
FIG. 8 is a graph showing voltage-transmittance curves of vertical-field-driven PS-BPLC cell with two prism sheets and conventional IPS PS-BPLC cell.

FIG. 8 is a graph showing voltage-transmittance curves of vertical-field-driven PS-BPLC cell (d=10 µm) with two prism sheets and conventional IPS PS-BPLC cell (d=3 µm, electrode space=3 µm, electrode width=4 µm). In the graph, hysteresis of the conventional IPS PS-BPLC cell and hysteresis of the vertical-field-driven PS-BPLC cell with two prism sheets are illustrated.

Referring to FIG. 8, in the V-T curves of the IPS PS-BPLC cell, a typical hysteresis property was seen with $\Delta V \sim 8V$ on sweeping the voltage to 90% maximum transmittance. The $\Delta V$ is a hysteresis voltage and is defined by a voltage difference at the intermediate location of the maximum transmittance. A ratio of $\Delta V$ to the peak sweep voltage was $\Delta V/V_p \sim 12.7\%$. At the same peak sweep voltage of 63V, the vertical-field-driven PS-BPLC cell showed hysteresis of $\Delta V \sim 3V$ and $\Delta V/V_p \sim 4.7\%$. The effective reduction of the hysteresis was noted.

However, when the peak sweep voltage was 40V, an appreciable difference between the vertical-field-driven PS-BPLC cell and the IPS PS-BPLC cell was observed. The V-T curves of the IPS PS-BPLC cell still showed a hysteresis of $\Delta V \sim 3.5V$ while the vertical-field-driven PS-BPLC cell showed nearly identical V-T curves at increasing and decreasing voltage sweep, which were attributed to the field distribution. In the vertical-field-driven cell, an electric field is uniformly formed, whereas an electric field formed by the IPS electrode is relatively non-uniform. Moreover, in the conventional IPS PS-BPLC mode, an extremely high electric field is required near the lower substrate and a very low transmittance is shown. In the vertical-field-driven PS-BPLC cell, the intensity of vertical electric field was about 4V/µm at a driving voltage of 40V and nearly 60% transmittance was shown. In the IPS PS-BPLC cell, a transversal electric field, near the lower substrate, was about 13.3V/µm at a driving voltage of 40V and the transmittance was under 25%. To drive the cell without hysteresis using the IPS mode including a blue phase liquid crystal, the driving voltage should be under 12V. In the IPS PS-BPLC cell, a critical voltage for a hysteresis-free drive was experimentally confirmed to be about 12V. Under the applied voltage of 12V, the transmittance of the IPS PS-BPLC cell was just 3%. The vertical-field-driven PS-BPLC cell is suitable for reducing hysteresis by effectively using the field-induced phase retardation as well as by providing the benefits of uniform electric field distribution.

Figure 9A:
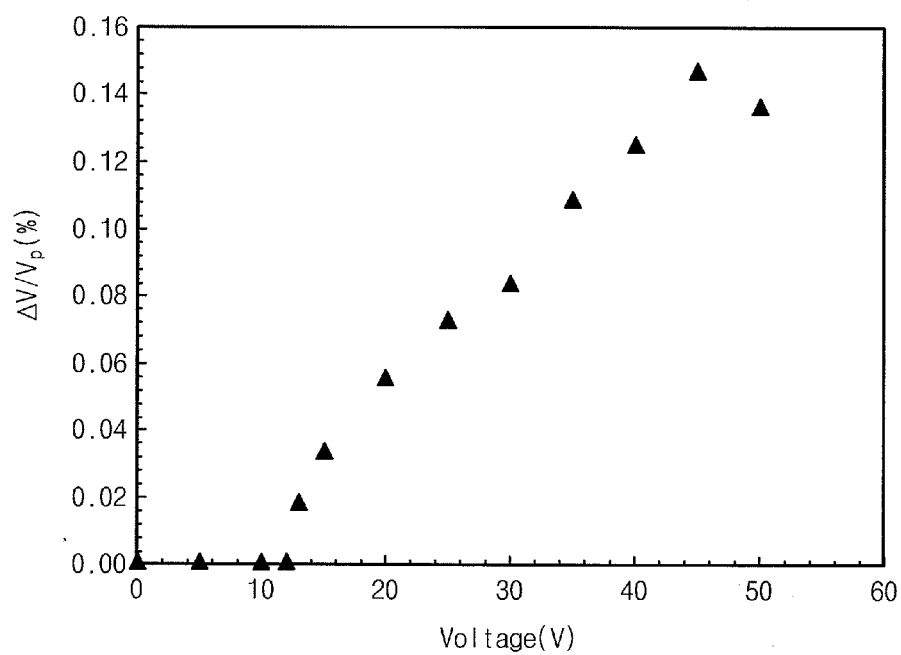
FIG. 9A is graphs showing $\Delta V/V_p$ of vertical-field-driven PS-BPLC cell according to an applied voltage.
Figure 9B:
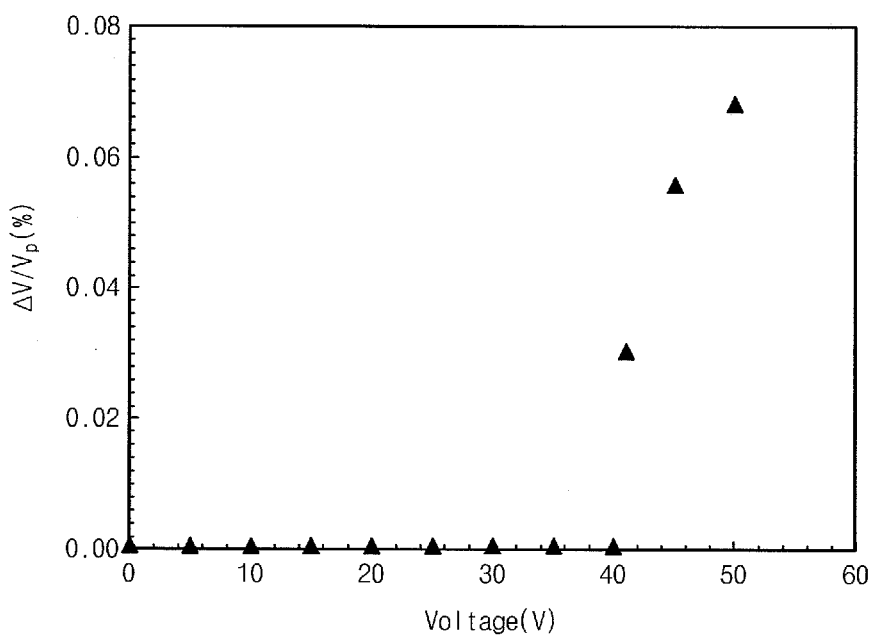
FIG. 9B is graphs showing $\Delta V/V_p$ of conventional IPS PS-BPLC cell according to an applied voltage.

FIG. 9A is graphs showing $\Delta V/V_p$ of vertical-field-driven PS-BPLC cell according to an applied voltage and FIG. 9B is graphs showing $\Delta V/V_p$ of conventional IPS PS-BPLC cell according to an applied voltage.

Referring to FIGS. 9A and 9B, similar to the result of hysteresis in FIG. 8, it can be confirmed that in the IPS PS-BPLC cell, $\Delta V/V_p$ began to increase at 12V. In vertical-field-driven PS-BPLC cell, $\Delta V/V_p$ began to increase at 40V.

Figure 10A:
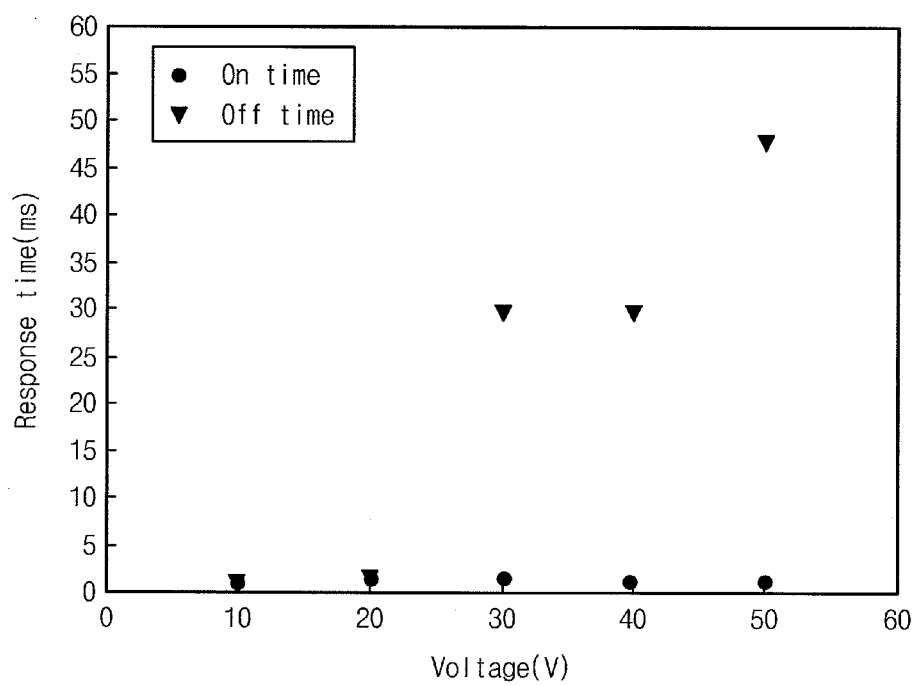
FIG. 10A is a graph showing on-off response time of vertical-field-driven PS-BPLC cell according to an applied voltage.
Figure 10B:
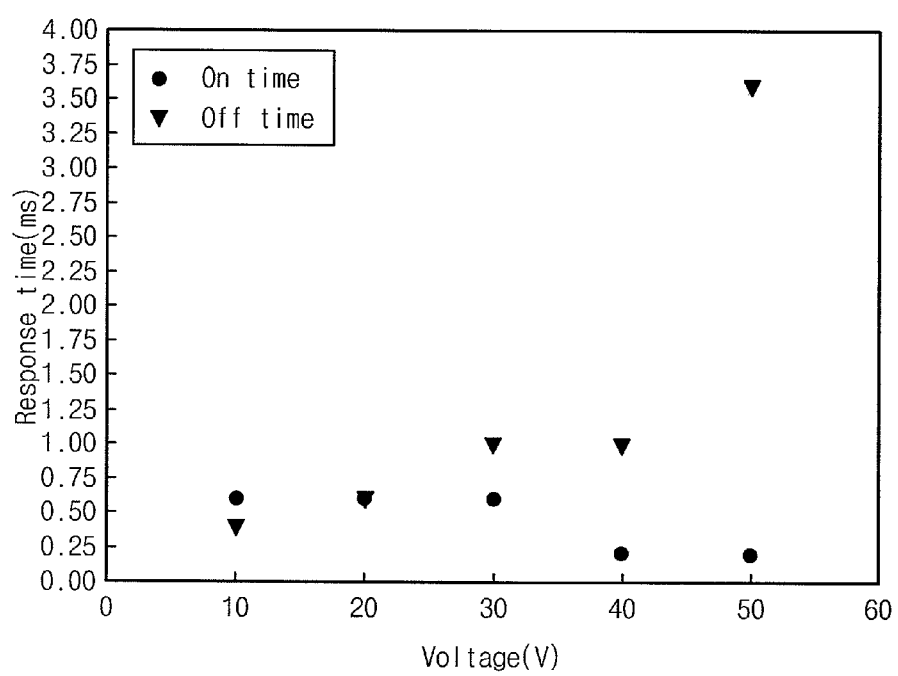
FIG. 10B is a graph showing on-off response time of IPS PS-BPLC cell according to an applied voltage.

FIG. 10A is a graph showing on-off response time of vertical-field-driven PS-BPLC cell according to an applied voltage and FIG. 10B is a graph showing on-off response time of IPS PS-BPLC cell according to an applied voltage.

Referring to FIGS. 10A and 10B, under the driving voltage condition, the on-off response time of the vertical-field-driven PS-BPLC cell was shorter than that of the IPS PS-BPLC cell. This is because that an electric field is uniformly distributed an entire liquid crystal area of the vertical-field-driven PS-BPLC cell and thereby an enough electric field induced phase can be realized in comparatively low electric field condition to that of the conventional art, and an enough brightness is also realized although the change of the liquid crystal molecules formed in the polymer is comparatively smaller to that of the conventional art.

According to an embodiment of the inventive concept, a display device is provided which has a high transmittance and can be driven at a low driving voltage as compared with a conventional blue phase liquid crystal display device of IPS driving system.

According to an embodiment of the inventive concept, a vertical-field-driven blue phase liquid crystal mode is provided which can solve a low transmittance and a high driving voltage of a conventional IPS blue phase liquid crystal mode.

According to an embodiment of the inventive concept, in the vertical-field-driven blue phase liquid crystal mode, since it does not need a patterned electrode, a fabrication process is very simple and it has a high aperture ratio, a low driving voltage and a reduced hysteresis.

What is claimed is:

1. A liquid crystal display device comprising:
   a first electrode;
   a second electrode facing the first electrode and forming a vertical electrical field together with the first electrode;
   a blue phase liquid crystal layer provided between the first electrode and the second electrode; and
   a first light path changing member provided to face the second electrode with the first electrode between the second electrode and the first light path changing member, the first light path changing a path of a incident light so that the incident light from the outside obliquely enters the blue phase liquid crystal layer with respect to the vertical electrical field.

2. The liquid crystal display device of claim 1, further comprising a second light path changing member provided to face the first electrode with the second electrode between the first electrode and the second light path changing member, wherein the second light path changing member changes a path of a light which passed through the blue phase liquid crystal layer.

3. The liquid crystal display device of claim 2, wherein at least one of the first light path changing member and the second light path changing member is an optical sheet including a plurality of protrusions of which cross section has a polygonal shape.

4. The liquid crystal display device of claim 3, wherein each protrusion has a pyramid shape.

5. The liquid crystal display device of claim 3, wherein the first light path changing member is a prism sheet having a plurality of prism mounts extending in a first direction.

6. The liquid crystal display device of claim 5, wherein the second light path changing member is a prism sheet having a plurality of prism mounts extending in a second direction.

7. The liquid crystal display device of claim 2, further comprising a first polarizer facing the blue phase liquid crystal layer with the first electrode between the blue phase liquid crystal layer and the first polarizer, wherein the first polarizer polarizes the incident light in a third direction.

8. The liquid crystal display device of claim 7, wherein the first polarizer is provided between the first electrode and the first light path changing member.

9. The liquid crystal display device of claim 7, wherein the first polarizer is provided to face the first electrode with the first light path changing member between the first electrode and the first polarizer.

10. The liquid crystal display device of claim 7, further comprising a second polarizer facing the blue phase liquid crystal layer with the second electrode between the blue phase liquid crystal layer and the second polarizer, wherein the second polarizer polarizes a light that passed through the blue phase liquid crystal layer in a fourth direction perpendicular to the third direction.

11. The liquid crystal display device of claim 10, wherein the second polarizer is provided between the second electrode and the second light path changing member.

12. The liquid crystal display device of claim 10, wherein the second polarizer is provided to face the second electrode with the second light path changing member between the second electrode and the second polarizer.

13. The liquid crystal display device of claim 4, further comprising a first base substrate provided between the first polarizer and the first electrode and the second base substrate provided between the second polarizer and the second electrode.

14. The liquid crystal display device of claim 1, wherein the blue phase liquid crystal layer has a body-centered cubic structure.

15. The liquid crystal display device of claim 14, wherein the blue phase liquid crystal layer is polymer-stabilized.

* * * * *